United States Patent [19]
Bloembergen et al.

[11] Patent Number: 5,462,983
[45] Date of Patent: Oct. 31, 1995

[54] BIODEGRADABLE MOLDABLE PRODUCTS AND FILMS COMPRISING BLENDS OF STARCH ESTERS AND POLYESTERS

[75] Inventors: Steven Bloembergen, South Lyon; Ramani Narayan, Okemos, both of Mich.

[73] Assignee: Evercorn, Inc., Lansing, Mich.

[21] Appl. No.: 97,563

[22] Filed: Jul. 27, 1993

[51] Int. Cl.$^6$ .............................. C08L 67/02; C08L 67/04
[52] U.S. Cl. ......................... 524/51; 523/128; 524/599; 524/601
[58] Field of Search .............................. 523/128; 524/51, 524/599

[56] References Cited

U.S. PATENT DOCUMENTS

| | | | |
|---|---|---|---|
| 3,306,875 | 2/1967 | Hay | 260/47 |
| 3,632,687 | 1/1972 | Walter et al. | 260/896 |
| 3,734,979 | 5/1973 | Koleske et al. | 260/897 |
| 3,850,862 | 11/1974 | Clendinning et al. | 260/7.5 |
| 3,850,863 | 11/1974 | Clendinning et al. | 260/7.5 |
| 3,867,324 | 2/1975 | Clendinning et al. | 260/23 H |
| 4,393,167 | 7/1983 | Holmes et al. | 525/64 |
| 4,863,655 | 9/1989 | Lacourse et al. | 264/53 |
| 4,873,270 | 10/1989 | Aime et al. | 523/128 |
| 4,891,404 | 1/1990 | Narayan et al. | 525/54.2 |
| 5,095,054 | 3/1993 | Lay et al. | 524/47 |
| 5,312,850 | 5/1994 | Iovine | 524/51 |
| 5,367,067 | 11/1994 | Frische | 536/45 |

FOREIGN PATENT DOCUMENTS

| | | | |
|---|---|---|---|
| 519367 | 12/1992 | European Pat. Off. | 523/128 |
| 530987 | 3/1993 | European Pat. Off. | 523/128 |
| 535994 | 4/1993 | European Pat. Off. | 523/128 |
| 4139468 | 6/1993 | Germany | 523/128 |
| 9119759 | 12/1991 | WIPO . | |
| 9214782 | 9/1992 | WIPO . | |
| 9216583 | 10/1992 | WIPO | 523/128 |

OTHER PUBLICATIONS

Gilmore et al., "The Fate of 'Biodegradable' Plastics in Municipal Leaf Compost", *J. Industr. Microbiol.*, 10:199–206 (1992).
Barak et al., "Biodegradability of Polyhydroxybutyrate (co–hydroxyvalerate) and Starch–Incorporated Polyethylene Plastic Films in Soils", *J. Envir. Qual.*, 20:173–178 (1991).
Krupp and Jewell, "Biodegradability of Modified Plastic Films in Controlled Biological Enrionments", *Environ. Sci. Technol.* 26:193–198 (1991).
Swanson et al., "Starch–Plastic Materials–Prep., Physical Prop. and Biodegradability", *J. Environ. Polymer Degrad.* 1(2):155–165 (1993).
Narayan, "Biodegradation of Polymeric Materials (Anthropogenic Macromolecules) During Composting", Proceedings: Int. Composting Research Symp., Columbus, Ohio (May 27–29, 1992).
Narayan, "Compatibilization of Lignocellulosics with Plastics", ACS Symposium Series 476, Emerging Tech. for Materials and Chemicals from Biomass, 200th Nat. Mtg., Am. Chem. Society, pp. 57–75 (1992).
Narayan, "Prep. of Corn–Based Plastics for Materials Appl", First Annual Corn Utilization Conf., pp. 209–219 (Jun. 11–12, 1987).
Narayan and Neu, "Composite Systems of Lignocellulosics with Synthetic Polymers", *Mat. Res. Soc. Symp. Proc.*, 197:55–65 (1990).
Stacy et al., "Biodegradable Natural–Synthetic Polymer Graft Copolymers", *Antec*, pp. 1362–1364 (1989).
Jarowenko, "Acetylated Starch and Miscellaneous Organic Esters", Chap. 4 in *Modified Starches: Properties and Uses* (Wurzburg, editor) CRC Press, Boca Raton, Fla., (1986).
Code of Federal Regulations, Title 21, Chapter 1, Part 172, Food Additives Permitted in Food for Human Consumption, Sec. 172,892, Food Starch–Modified, U.S. Gov. Printing Office, Washington, D.C. (1981).
Mullen and Pacsu, "Possible Industrial Utilization of Starch Esters", *Ind. Eng. Chem.* 35:381–384 (1943).
Wolff et al., "Triesters of Corn Starch, Amylose, and Amylopectin", *Ind. Eng. Chem.*, 43:911–914 (1951).
Rivard et al., "Effects of Natural Polymer Acetylation on the Anaerobic Bioconv. to Methane and Carbon Dioxide", *Appl. Biochem. Biotechnol.* 34/35:725–736 (1992).
Avella and Martuscelli, "Poly–D(–)–(3–hydroxybutyrate)/ Poly(ethylene oxide) Blends: Phase Diagram, Thermal and Crystallization Behavior", *Polymer,* 29:1731–1737 (1988).
Greco and Martuscelli, "Crystallization and Thermal Behavior of Poly(D(–)–3–hydroxybutyrate)–Based Blends", *Polymer,* 30:1475–83 (1989).
Marand and Collins, "Crystallization and Morphology of Poly(vinylidene Fluoride)/Poly(3–Hydroxybutyrate) Blends", Am. Chm. Soc. Div. Polym. Chm., *Polymer Preprints,* 31:552–3 (1990).
Dave et al., "Biodegradation of Blends Containing Poly (3–hydroxybutyrate–co–valerate)", *Biotechnol. Polym.*, Plenum Press, N.Y. (1991).
Dave et al., "Morphological and Blend Miscibility Effects on Biodegrad. of Poly(3–hydroxybutyrate–co–3–hydroxyvalerate) and Blends", Polym. Mater. Sci. Eng. 63:726 (1990).
Gilmore et al., "Biodegradability of Poly(3–hydroxybutyrate–co–3–hydroxyvalerate) with Ester–substituted Celluloses", *Biodegradable Polym. and Plast.*, Royal Soc. of Chem., Cambridge, pp. 251–254 (1992).
Benedict et al., "Fungal Degradation of Polycaprolactones", *J. Appl. Sci.*, 28:327–331 (1983).
Benedict et al., "Polycaprolactone Degradation by Mixed and Pure Cultures of Bacteria and a Yeast", *J. Appl. Polym. Sci.*, 28:335 (1983).

(List continued on next page.)

Primary Examiner—Patricia A. Short
Attorney, Agent, or Firm—Quarles & Brady

[57] ABSTRACT

Biodegradable moldable products and films prepared from a compatible blend containing a biodegradable, hydrophobic, starch ester and a biodegradable polyester, and optionally a biodegradable and miscible plasticizer and/or a compatible filler.

13 Claims, 4 Drawing Sheets

OTHER PUBLICATIONS

Cook et al., "Scanning Electron Microscopic Visualization of Biodegradation of Polycaprolactone by Fungi", *J. Polym. Sci.*, Polym. Lett. Ed., 19:159–164 (1981).

Tokiwa et al., "Degradation of Polycaprolactone by a Fungus", *J. Ferment. Technol.*, 54:603–607 (1976).

Fields et al., "Microbial Degradation of Polyesters: Polycaprolactone DEgraded by P. *pullans*", *J. Appl. Polym. Sci.*, 18:3571 (1974).

Jesudason et al., "Enzymatic Degradation of Poly ([R,S] β–Hydroxybutyrate)", *J. of Env. Polym. Degrad.*, 1:89–98 (1993).

Doi et al., "Struct. Effects on Biodeg. of Microbial and Synthetic Poly(hydroxyalkanoates)", *Biodegrad. Polym. and Plas.*, The Royal Society of Chemistry, Cambridge, pp. 139–148 (1992).

Tanghe, "Determ. of Acetyl content and Degree of Substitution of Cellulose Acetate", *Methods in Carbohydrate Chemistry*, vol. III–Cellulose, (Whistler, editor) Acad. Press, N.Y., pp. 201–203 (1963).

BIODEGRADABLE MOLDABLE PRODUCTS AND FILMS COMPRISING BLENDS OF STARCH ESTERS AND POLYESTERS

TECHNICAL FIELD

This invention relates to the preparation of biodegradable thermoplastic films and moldable compositions containing a hydrophobic modified starch. More specifically, the present invention relates to a process of making blends of biodegradable starch esters with biodegradable polyesters to give products having improved processability, increased water resistance, and an extended range of mechanical properties.

BACKGROUND OF THE INVENTION

Traditionally, plastics have been formulated to result in strong, light-weight, durable, and bioresistant polymeric materials. It is the durability and indestructibility that makes plastic the material of choice for many applications. However, these same properties are problems when the plastics enter the waste stream. The recent trend is to create biodegradable most of such plastics being first commercialized in the mid 1980's.[1]

Among the first 'biodegradable' plastics made were blends of non-biodegradable polyolefins with starch which were at best only partially biodegradable.[2-4] These plastics are not compatible with waste management infrastructures, such as composting. Moreover, at that time, the appropriate infrastructures capable of dealing with biodegradables did not exist. Instead of composting, these products generally ended up in sanitary landfills.

Landfills, in general, are a poor choice as a repository of plastic and organic waste. Landfills are plastic-lined tombs designed to retard biodegradation by providing little or no moisture with negligible microbial activity. Organic waste, such as lawn and yard waste, paper, and food waste should not be entombed in such landfills to be preserved for posterity. Accordingly, there is a growing trend to divert these materials into composting facilities which allow them to be biodegraded to produce humus or compost. This compost can then be used as a valuable soil additive for new plant growth.

When plastics are designed to be biodegradable, utilizing renewable resources as the major raw material component, the plastics can become part of an ecologically sound mechanism.

Biodegradation of natural materials produces valuable compost as the major product, in addition to water and carbon dioxide. Such carbon dioxide is fixed or neutral and therefore does not contribute to an increase in the greenhouse gases.

The co-pending patent application,[5] describes a method of preparing biodegradable moldable products and films which includes the steps of preparing a biodegradable, hydrophobic, modified starch, and forming a thermoplastic product, comprising the modified starch, and optionally a miscible and biodegradable plasticizer, and/or a compatible filler. A key aspect of the co-pending patent application[5] is that the modified starch polymers described therein are fully biodegradable, as opposed to blends of biodegradable starch compositions with conventional petroleum-based plastics described earlier. Such blend compositions are at best biodisintregable and not fully biodegradable.[2-4] In composting, the non-biodegradable components will be persistent in an irreversible build-up of these components in the environment causing reduced productivity and fertility of the soil.[6] Even if such 'biodegradable' blend compositions, described in the prior art, are partially biodegradable, the resulting compost will have very little value. In fact, these recalcitrant components will be present in the final compost at significantly higher concentration levels than in the original waste mixture.[6]

Rowell, Schultz and Narayan published an overview on the emerging technologies from materials and chemicals from biomass.[7] In the first chapter of that book Narayan discusses the need for environmentally compatible polymers based on renewable resources. In that book is included a discussion of tailor-made cellulose-polystyrene graft polymers which were used as compatibilizers/interfacial agents to prepare cellulosic-polystyrene alloys and wood-plastic alloys (Chapter 5, pp. 57–75). The graft copolymers function as emulsifying agents and provide for a stabilized, fine dispersion of the polystyrene phase in the continuous phase of the cellulosic matrix. U.S. Pat. No. 4,891,404 to Narayan et al.[8] discusses a specific nucleophilic displacement reaction used to prepare such graft polymers which are disclosed to be biodegradable thermoplastic copolymers exhibiting a high capacity for stabilized biodegradable blends of polysaccharide and synthetic thermoplastic polymers. The patent discusses the problems relating to the making of cellulose/starch natural biopolymers and the problem of controlling the molecular weights and degree of substitution of such polymers. Earlier papers by Narayan and Stacy et al.[9-11] further discuss biodegradable natural/synthetic graft copolymers.

U.S. Pat. No. 5,095,054 to Lay et al.,[12] issued Mar. 10, 1992, discloses the use of water as a plasticizer for starch (referred to as starch "destructurization") in order to make the material processable in for example an extruder. Products derived therefrom, tend to have the problem of rapidly losing water to the environment by evaporation. As a result this type of material tends to become brittle with age. These materials are also highly water sensitive which is undesirable the majority of applications of thermoplastic products.

To address this issue of water sensitivity, the patent also includes various blends of destructurized starch with a variety of synthetic petroleum-based plastics. Such blend compositions, along with earlier starch-filled polyolefins, are at best only biodisintregable and not fully biodegradable.[2-4] Similar starch-polyolefin compositions have been reported by the Fertec group.[13]

U.S. Pat. No. 4,873,270 to Aime et al., 14 issued Oct. 10, 1989, describes blends of polyurethane with for example poly(vinyl chloride) and a carbohydrate such as potato flour. U.S. Pat. Nos. 3,850,862 and 3,850,863 to Clendinning et al.,[15,16] issued Nov. 26, 1974, disclose blends of a naturally biodegradable product, such as tree bark, protein, starch, peat moss, saw dust, etc., with a dialkanoyl polymer,[15] such as poly(alkylene adipate), or with an oxyalkanoyl polymer,[16] such as poly(caprolactone).

The U.S. Pat. No. 4,863,655 to Lacourse et al.,[17] issued Sep. 5, 1989, discloses water-soluble high amylose starch based containing poly(vinyl alcohol). This biodegradable modified starch product intended for loose fill, or "peanut-shell"-type foam packaging applications, for example, contains a hydroxypropoxylated starch having a very low degree of substitution. This type of modified starch is highly hydrophilic and water soluble; the starch contains about 5% by weight propylene oxide corresponding to a theoretical degree of substitution of 0.19. This is a very low degree of substitution compared with the maximum degree of substitution for starch which is 3.0 according to the three available hydroxyl groups on the anhydroglucose repeat unit. The poly(vinyl alcohol) typically used as a blend component further adds to the water-sensitive nature of these materials. In the case of peanut-shell packaging, the water solubility of such starch-based foams is in fact a positive attribute as this allows the material to be disposed of in an environmentally friendly fashion by simply washing them with water down the drain; the material subsequently biodegrades in the sewer system. For other applications, however, which utilize moldable compositions for various packaging applications, fast food cutlery, plates, cups, etc., need for moisture resistance is of ultimate importance.

The prior art on biodegradable materials and blends is restricted to starch-based materials in which the starch component is hydrophilic (water sensitive). No prior art exists on blends containing hydrophobic, thermoplastic modified starches as fully biodegradable products which are readily processable on conventional plastics processing equipment such as extruders, injection molders, etc.

There are a number of patents and publications in the literature relating to modification of starch by esterification and etherification reactions. Most commercial modified starch products have low degree of substitution (DS) levels designed to alter their solution properties for food applications or adhesion to paper. Acetylated starches, for example, have been known for more than 100 years. Starch acetates ranging from about 0.3 to about 1 DS are typified by water solubility.[18] Starch esters which are commercially available for consumption, used for example in salad dressings, have a degree of substitution which typically is lower than 0.1 DS. For example, starch derivatives are cleared for food use by the U.S. Food and Drug Administration (FDA) up to a 4% treatment level, which is equivalent to 0.07 DS.[19] Highly acetylated starches, historically, were of some interest because of their organic solvent solubility and their thermoplasticity for film and fiber applications analogous to thermoplastic cellulose esters. In spite of this early development, high DS starch esters have not been developed commercially because they could not compete with similar cellulose derivatives in terms of strength and cost.[18] Of primary focus were starch triesters, which fell short in strength and impact properties.[20,21] Such high-DS starch esters are characterized by their crystalline properties exhibiting clear melt transitions.[22] These high-DS starch esters are not biodegradable. Rivard et al. showed that under anaerobic conditions starch esters (as well as other esters of polysaccharide, including cellulose esters) above substitution levels of about DS=1.7 were not biodegradable.[23] We have obtained similar results in our laboratory under composting conditions.

In the co-pending patent application U.S. Ser. No. 08/097,550,[5] applicants have designed starch esters with the degree of substitution, prepared by a unique homogeneous base-catalyzed system under anhydrous conditions, that allows us to obtain starch ester compositions having good mechanical properties while maintaining complete biodegradability. This requires such starch ester compositions to have an intermediate degree of substitution, preferably ranging from 0.4 to 2.5 DS, more preferably from 1.0 to 2.0, and most preferably from 1.2 to 1.7 DS. The latter range of compositions have the most preferred balance in mechanical properties, water resistance, processability and the rate of biodegradation. The starch esters prepared by the co-pending patent application,[5] are predominantly amorphous polymers; little or no residual native starch crystallinity remains due to the homogeneous modification process employed. Without being restrictive, the absence of a new crystalline structure for the starch esters produced by this process probably relates to the range of intermediate degrees of substitution to give non-crystalline copolymers. High DS starch triesters approach the structure of a homopolymer having the needed macromolecular chain regularity required for crystallization. In the starch esters the co-pending patent application,[5] on the other hand, the placement of ester groups on the anhydroglucose repeat units probably follows a close to statistically random distribution pattern resulting in irregular macromolecular chains, giving rise to novel amorphous thermoplastics with unique properties.

The concept of blending polymers is not a new one, and a number of combinations of useful blends are known. In fact, polymer blends have become an important subject of scientific investigation in recent years because of their growing commercial importance.[24] An example of a miscible blend system includes the polystyrene/poly(phenylene oxide) blends marketed by General Electric under the trade name NORYL which have enhanced dimensional stability compared with polystyrene (PS), while rendering the poly(phenylene oxide) (PPO) component more readily processable.[25] Miscibility of the two polymers results in a single glass transition temperature, $T_g$, for the blend which is composition dependent, as per the Fox-Flory theory ($T_g$ for PS~100° C.; $T_g$ for PPO~210° C.).

In spite of considerable work done on synthetic polymer-polymer blends, lignocellulosic and other natural polymer-based systems like starch and starch derivatives have seen little use for preparing polymer blend and alloy systems.[9] The inventors have reported several blends and alloys containing natural polymers for materials applications. Narayan et al. have reported on blends and alloys containing lignocellulosics,[11] starch,[8–10] and cellulose acetate.[7,11] Bloembergen et al. have reported on blends of naturally occurring PHB/V.[26–31] The terms blends and alloys are often used interchangeably possibly because of the convenience of semantics equating the two concepts. While the term "blend" is a general term for a mixture of two or more polymers, the term "alloy" is generally used to describe a specific type of blend, namely a "compatibilized blend" that offers a unique combination or enhancement of properties.[7]

In the field of biodegradable materials, the two most critical issues in developing strong and useful blends are: 1) miscibility or compatibility of the polymer blend components, and 2) complete biodegradability (mineralization) of the components. For example, bacterial poly(β-hydroxybutyrate) (PHB) is notable for its properties as a fully biodegradable yet highly crystalline thermoplastic,[32,33] biosynthesized by a variety of bacteria as an intracellular storage material. In the context of usable thermoplastics, the high melting temperature[33] and brittleness[34] limits its use.[35] An attractive solution to the limitations of PHB homopolymer is through blending with a second polymer. PHB has been shown to be miscible with poly(ethylene oxide),[36] poly(vinyl acetate),[37] poly(vinylidine fluoride),[38] and poly(vinyl chloride).[39] U.S. Pat. No. 4,393,167 to ICI discloses polymer blends of PHB and PHB/V with chlorinated polyethylene, poly(vinyl chloride), and Polyacrylonitrile.[40] All of these petroleum-based plastics introduced as blend components are not biodegradable, and hence such blend compositions are again at best biodisintregable and not fully biodegradable.

Blends of PHB/V with cellulose esters have been reported, however, both environmental and enzymatic assays on the blend films showed a strong inhibiting effect of the cellulose esters on PHB/V degradation.[41] As mentioned previously, this is to be expected for such high DS polysaccharides.[23]

TONE Polymers are poly(ε-caprolactone) (PCL) resins marketed by Union Carbide. Several U.S. patents disclose their varying degree of compatibility in blends with polyolefins, including polyethylene, polypropylene, polystyrene, polycarbonate and poly(ethylene terephthalate).[42–44] PCL is one of the few synthetic petroleum-based polymers known to be fully biodegradable.[45–49] While PCL is a biodegradable polymer, blends of PCL with such conventional non-biodegradable plastics are at best biodisintregable and not fully biodegradable.

Examples of biodegradable blends which meet both requirements of miscibility/compatibility and biodegradability includes blends of the naturally occurring bacterial PHB with synthetic PHB analogs.[26–31] Since synthetic PHB of moderate tacticity is biodegradable,[50,51] the blend should also retain this property.[31] Another biodegradable blend which has been reported is a blend of PHB/V with PCL.[52]

The present invention describes a method of preparing a blend system which is compatibilized and contains fully biodegradable components for making moldable products and films. The compatibilized blend system has been designed and engineered by blending biodegradable, hydrophobic, starch esters with biodegradable polyesters. Examples of biodegradable polyesters include poly(caprolactone) (PCL), poly(vinylacetate-co-vinylalcohol) (PVAc/VA), poly(lactic acid) or polylactide (PLA), poly(glycolic acid) or polyglycolide (PGA), and related copolyesters including the various combinations of stereoisomers, bacterial and synthetic poly(β-hydroxybutyrate) (PHB), Poly(β-hydroxybutyrate-co-β-hydroxyvalerate) (PHB/V), and other poly(β-hydroxyalkanoates) (PHA), and aliphatic biodegradable polyesters.

It is desirable to achieve good processability and mechanical properties with the above-mentioned blends. However, there remains a need for such processable products which are also biodegradable. There is a need for developing new starch-based materials which utilize agricultural resources and return those resources to nature in an environmentally sound manner. The present invention provides new polymeric materials which are environmentally compatible.

SUMMARY OF THE INVENTION

In accordance with the present invention, there is provided a biodegradable moldable product or film product prepared from a compatible blend containing a biodegradable, hydrophobic, starch ester and a biodegradable polyester.

The present invention provides a method for obtaining miscible blends, containing a high molecular weight, thermoplastic modified-starch product with controlled degree of substitution, and a biodegradable polyester, and optionally a biodegradable and miscible plasticizer, and/or a compatible filler. The plasticizer is selected from the group including a variety of biodegradable esters miscible with the starch ester and polyester. Compounding with compatible additives, preferably talc and similar inorganic structural fillers, provides added compositions of matter with unusually increased strength and modulus. These products are readily processable, water resistant, and have good mechanical properties. Most importantly, the polymers are fully biodegradable and after their end-use can be composted to produce valuable soil amendment.

BRIEF DESCRIPTION OF THE FIGURES

Other advantages of the present invention will be readily appreciated as the same becomes better understood by reference to the following detailed description when considered in connection with the accompanying drawings wherein.

DETAILED DESCRIPTION OF THE INVENTION

Figure 1:
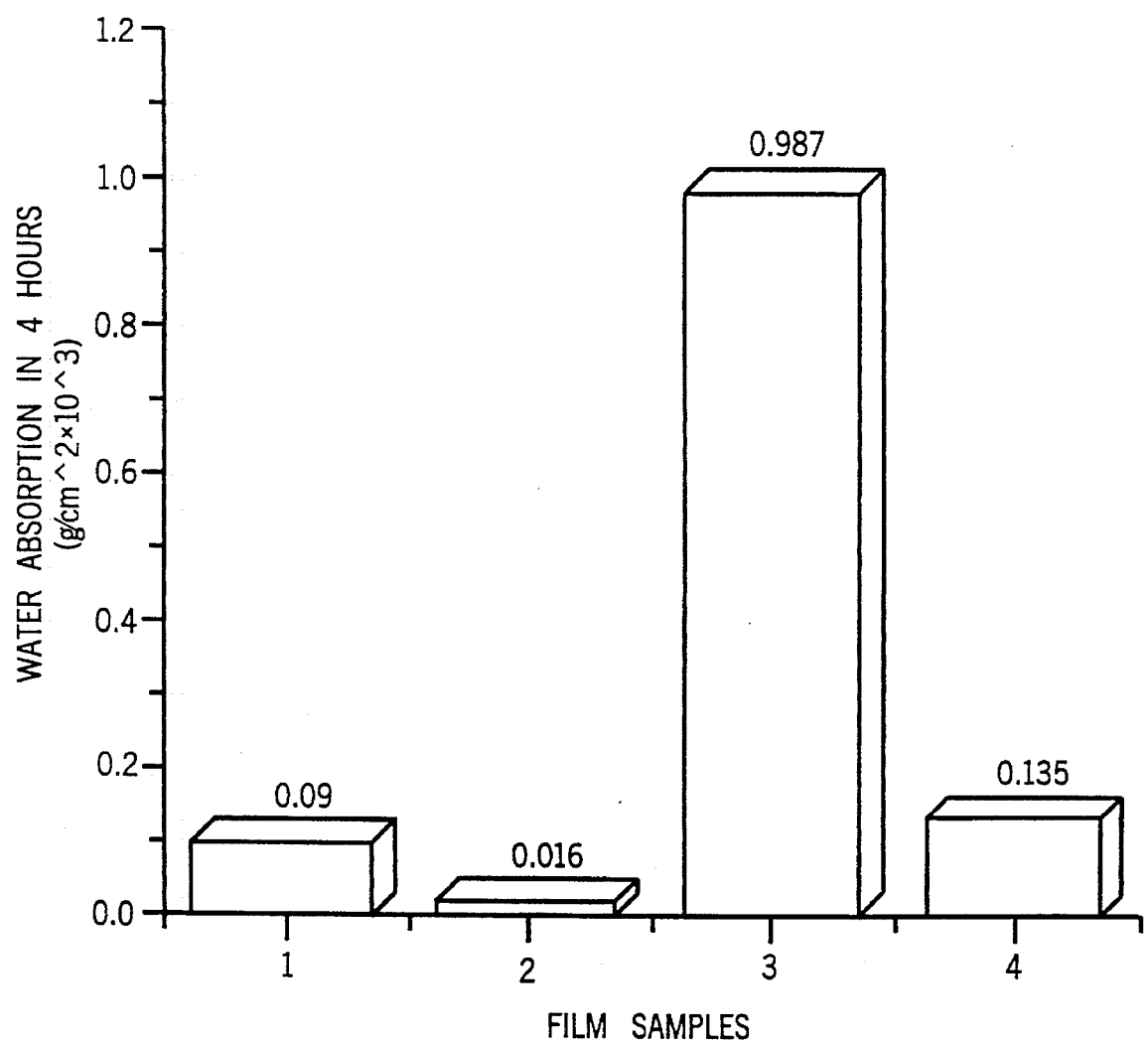
FIG. 1 is a bar graph showing water absorption determined by Cobb Test Method for Polyethylene, PHB/V, with modified starch and a modified starch-PHB/V blend, bar 1 being polyethylene, bar 2 being PHB/V from example 4-4, bar 3 being modified starch from example 4-1, and bar 4 being a 50/50 modified starch -PHB/V Blend from example 4-3.

The present invention provides a biodegradable product or film product and method of making the same wherein, generally, the product is prepared from a compatible blend containing a biodegradable, hydrophobic, starch ester and a biodegradable polyester.

The degree of substitution (DS) of a polymer is the (average) number of substituent groups attached per base unit (in the case of condensation polymers) or per monomeric unit (in the case of additional polymers). The term has been used mainly in cellulose chemistry where each anhydroglucose unit has three reactive (hydroxyl) groups. Degree of substitution can then range from zero (cellulose itself) to three (fully substituted cellulose). The same chemistry applies herein to starch wherein each glucose moiety has three reactive hydroxyl sites.

The co-pending patent[5] discloses a method of preparing a biodegradable modified starch polymer generally by the steps of combining a starch with an anhydride, organic acid, acid chloride, ketene, or other esterification reagents in an anhydrous aprotic solvent, optionally in the presence of a basic catalyst thereby causing a reaction between the starch and anhydride, organic acid, acid chloride, ketene or other esterification reagents, optionally neutralizing the reaction during the combining step and then forming a hydrophobic biodegradable starch ester product.

Starch $(C_6H_{10}O5)_n$ is a mixture of linear (amylose) and branched (amylopectin) polymers. Amylose is essentially a linear polymer of $\alpha(1\rightarrow 4)$ linked D-glucopyranosyl units. Amylopectin is a highly-branched polymer of D-glucopyranosyl units containing $\alpha(1\rightarrow 4)$ linkages, with $\alpha(1\rightarrow 6)$ linkages at the branch points. The modified starch of the present invention can be used with various types of starches, such as regular corn starch which contains about 75% amylopectin (higher molecular weight branched starch polymer) and 25% amylose (lower molecular weight linear starch polymer), as well as hybrid corn starch products containing more than 50% amylose, sold by National Starch and Chemical Company Corporation and American Maize Products Company. Various other starches, such as potato starch, tapioca starch, rice starch, wheat starch, cassava starch, and other starches familiar to those skilled in the art can be utilized in accordance with the present invention. Compositions having increased levels of linear starch polymers are most likely to be the correct choice in terms of processability, film forming, molding and mechanical properties.

The starch ester compositions of the present invention comprise what is considered in the art to be a specialty starch, preferably having an amylose content greater than 50% and most preferably greater than 70%. The degree of substitution preferably ranges from 0.4 to 2.5 DS and more preferably from 1.0 to 2.0 DS. The most preferred composition ranges from 1.2 to 1.7 DS.

The aforementioned starches can be made into a wide range of starch esters using a wide variety of anhydrides, organic acids, acid chlorides, ketene, or other esterification reagents. Examples of anhydrides include acetic-, propionic-, butyric-, maleic-, succinic-, phthalic- and stearic anhydride anhydrides and combinations thereof to derive copolymer derivatives. Such starch esters can be made in accordance with the co-pending patent application.[5]

Other methods exist and can be developed for making such starch ester products. However, it is highly desirable that these starch esters be capable of forming hydrophobic products which are water repellant, in contrast to starch raw material which is hydrophilic and water soluble. The blends of biodegradable starch esters with biodegradable polyesters of the present invention provide products which are also hydrophobic (water repellant) while having good processability, good mechanical properties, and being fully biodegradable.

Examples of biodegradable polyesters include poly(caprolactone) (PCL), poly(vinylacetate-co-vinylalcohol) (PVAc/VA), poly(lactic acid) or polylactide (PLA), poly(glycolic acid) or polyglycolide (PGA), and related copolyesters including the various combinations of stereoisomers, bacterial and synthetic poly(-hydroxybutyrate) poly(β-hydroxybutyrate-co-β-hydroxyvalerate) (PHB/V), and other poly(β-hydroxyalkanoates) (PHA), and aliphatic biodegradable polyesters.

A plasticizer can be added to the composition to achieve greater material processability and product flexibility. Molded articles and films prepared from the blends of starch esters with polyesters can be enhanced by mixing with a variety of low molecular-weight ester plasticizers of the solvent type. An obvious requirement of these plasticizers is that they are biodegradable. Examples of such plasticizers include a variety of esters, such as phthalate esters (dimethyl-, diethyl-, dipropyl-, dibutyl-, dihexyl-, diheptyl-, dioctyl-, etc.), dimethyl- and diethylsuccinate and related esters, glycerol triacetate (triacetin), glycerol mono- and diacetate, glycerol mono-, di and tripropionate, glycerol tributanoate (tributyrin), glycerol mono- and dibutanoate, glycerol mono-, di- and tristearate, and other related glycerol esters, lactic acid esters, citric acid esters, adipic acid esters, stearic acid esters, oleic acid esters, ricinoleic acid esters, other fatty acid esters, erucic acid esters, soybean oil, caster oil, and various other biodegradable esters known in the chemical arts. Preferably, triacetin is used as a suitable plasticizer since it induces high flexibility, is virtually odorless, has a relatively high boiling point (258° C.), is biodegradable, and is commercially available at a reasonable cost as reported in Chemical Marketing Reporter, Mar. 23, 1992.

Inorganic and organic fillers can be added to extend the range of properties of molded articles. Such inorganic fillers include talc (hydrous magnesium silicate), titanium dioxide, calcium carbonate, clay, sand, chalk, limestone, diatomaceous earth, silicates, boron nitride, mica, glass, quartz, and ceramics, and biodegradable organic fillers such as starch, cellulose, wood flour and fibers, pecan fibers, and other inorganic and organic filler materials well known in the chemical arts.

Compounding with compatible additives, preferably talc and similar inorganic structural fillers, provides added compositions of matter with unusually increased strength and modulus.

By utilizing the blend of the biodegradable starch esters and the biodegradable polyester described above with a minor amount of a solvent-type plasticizer, the overall processing temperature can be reduced to well below the processing temperature of the pure polyester component, as exemplified in the experimental section below. This is particularly important for manufacturing with high-melting polyesters such as PHB and PHB/V, which thermally degrade at higher processing temperatures and therefore have a narrower processing window. It is expected that this improvement is attributed to the compatibility achieved by the blending process, resulting in changes in the crystalline microstructure of the polyester component and/or the morphology of the multi-phase material thereby rendering it processable at lower processing temperatures. Critical to these factors is the compatibility of the blended components.

The products of the present invention possess water repellant properties while still retaining their biodegradability. The water resistance of the starch esters is improved by blending with high molecular weight biodegradable polyesters, especially with semi-crystalline polyesters such as PCL or PHB/V, and similar biodegradable polyesters. This is further achieved by engineering the appropriate degree of substitution and molecular weight of the starch ester component, by blend composition, choice of polyester, copolyester composition, and by plasticizer composition.

The present invention can be processed by various methods known in the art, such as extrusion pelletizing, injection molding, and film forming methods known to those skilled in the art. For example, the biodegradable starch ester products made in accordance with the present invention can be injection molded to give a variety of molded products, and extrusion cast to give translucent flexible films, as well as transparent films.

The following experimental examples demonstrate the utility of the present invention for forming biodegradable products containing a biodegradable, hydrophobic, starch ester and a biodegradable polyester, and optionally a biodegradable and miscible plasticizer, and/or a compatible filler.

Examples of materials made in accordance with the present invention in compost experiments confirm biodegradability.

EXAMPLES

Example 1

A starch modification reaction was carried out, in accordance with the method described in the co-pending patent application,[5] using as follows: 1502 g dried Hylon VII high-amylose corn starch obtained from National Starch and Chemical Corp. (=9.25 moles of anhydroglucose repeat units; water content ~2000 ppm) was dispersed in 10 L of anhydrous DMSO (water content ~250 ppm) under rapid mechanical agitation at about 20 to 25° C., in a 10 gallon jacketed vessel. The dispersion was dissolved by heating the mixture under mechanical agitation in a nitrogen atmosphere to 80°±5° C., for approximately 10 min. Subsequently the mixture was cooled to room temperature (~25° C.); 90 g of DMAP powder was dissolved at room temperature in 2.5 L of anhydrous DMSO and added to the vessel. Next, 1558 g sodium bicarbonate powder (approx. equimolar level based on anhydride) was added to the stirred vessel. Starch modification was achieved by the addition of 2284 g (2075 mL) propionic anhydride (=17.6 moles; DS-theor.=1.9), over the course of 1 hour while maintaining the reaction temperature below 30° C. by circulating cooling water through the jacket of the 10 gallon vessel. The continuous slow addition of anhydride over the given time period, as opposed to batch addition at the start of the reaction, has the advantage of controlling the reaction exotherm, and minimizing the average ratio of anhydride-generated acid to neutralizing agent during the reaction. As a result, these reaction conditions minimize molecular weight reduction of the starch or modified starch in the mixture. The product was recovered 10 by precipitation in approximately 20 gal. (~75 L) of water under vigorous mechanical agitation, and filtered off over a pressure filter. A pH=7.3 was recorded for the precipitate which was washed 5 times with about 20 gal. of water (pH of water~9.4) to give a final pH=8.6 for the fifth wash. The product was dried by placing a ½ inch thick layer of the product crumbs on multiple stainless steel trays in a grounded convectional air-driven oven at 55° C. for 48 hours. A yield of 90% was obtained. The degree of substitution (DS) was determined to be DS=1.77, 1.69 and 1.69 by titration for 3 triplicate sets of hydrolyzed samples according to a published method.[53] A DS=1.4 was calculated based on the conversion of anhydride.

Example 2

The procedure given in example 1 was followed using 2250 g dried Hylon VII high-amylose corn starch in 15 L anhydrous DMSO, to which was added 2108 g sodium bicarbonate, and 122 g DMAP dissolved in 1.75 L of anhydrous DMSO. 3434 g (3119 mL) of Propionic anhydride (DS-theor.=1.9) was added to the vessel over the course of 1 hour. Subsequently, a solution of 68.1 g of maleic anhydride (DS-theor.=0.05) in 10 2 L anhydrous DMSO was added to the vessel over the course of 15 min. A pH=7.5 was recorded for the precipitate which was washed 5 times with about 20 gal. of water (pH of water~9.4) to give a final pH=9.4 for the fifth wash. The yield of the starch ester product was 88%. A DS=1.4 was calculated based on the conversion of anhydride.

Example 3

A starch modification reaction was carried out using as follows: 45.5 g of dried Hylon VII high-amylose corn starch (=0.28 moles of anhydroglucose repeat units; water content~2000 ppm) was dispersed in 300 mL of anhydrous DMSO (water content~250 ppm) under rapid mechanical agitation at about 20° to 25° C., in a 500 mL four-necked flask. The dispersion was dissolved by heating the mixture under mechanical agitation in a nitrogen atmosphere to 80°±5° C., for approximately 10 min. Subsequently the mixture was cooled to room temperature (~25° C.), and 31.7 g of acetic anhydride (=0.31 moles; DS-theor.=1.1) and 41.9 g of propionic anhydride (=0.32 moles; DS-theor.=1.2) was slowly added over the course of 30 min. to avoid precipitation of starch. Starch modification was achieved by the addition of 3.2 g of DMAP (dissolved in 25 mL of anhydrous DMSO) over the course of 30 min. while maintaining the reaction temperature below 30° C. by cooling with an ice/water bath. The product was recovered by precipitation in a ten-fold excess of water under vigorous mechanical agitation; the water/precipitate mixture was ground in a blender to improve the work-up. A pH=3.5 was recorded for the precipitate which was washed 7 times with about 1 L of water (pH of water~9.4) to give a final pH=8.2 for the seventh wash. The product was filtered over a Buchner funnel and dried by placing the crumbs on a teflon tray in a vacuum oven at 55° C. through which a steady flow of dry nitrogen was passed for 24 hours. A yield of 91% was obtained. A DS=1.8 was calculated based on the conversion, and assuming equal reactivity of the anhydrides.

Example 4

Blends were prepared containing a modified starch copolymer and a β-hydroxybutyrate/β-hydroxyvalerate, or PHB/V, copolymer. The PHB/V sample was a high-purity medical-grade copolymer containing about 20 mole % β-hydroxyvalerate, obtained from Imperial Chemical Industries (ICI) in the U.K. The modified starch was prepared in Example 3 given above, using a 50/50 ratio of acetic- and propionic anhydrides to give a starch copolymer having an overall degree of substitution (DS) of about 1.8, in accordance with the method described in the co-pending patent application.[5] Solution blends were prepared in 45/55 vol. % acetone/methylene chloride according to the compositions given in Table 1.

Films were cast on a glass plate using a 0.010" casting blade, and dried for 10 min. at 60° C. Subsequently, the samples were dried for 10 hrs. at 65° C. in a vacuum oven to remove residual levels of acetone solvent. Following the first 10 min. drying stage, the solution-cast films readily lifted from the glass surface, and were highly flexible and transparent at all compositions given in Table 1, except for the pure starch ester (Ex. 4-1) which was relatively brittle; these pure starch ester films typically require a small amount of ester plasticizer to give a flexible film.[5] The resulting transparency indicates miscibility of the two ester polymers, which is a key aspect of the present invention.

FIG. 1 illustrates that blending of 10 modified starch with a polyester such as PHB/V reduces the water absorption when the film is placed in direct contact with water. Although the water absorption of the starch ester film is already fairly low at $0.987 \times 10^{-3}$ g/cm$^2$ (4 hrs), this was further reduced to $0.135 \times 10^{-3}$ g/cm$^2$ (4 hrs.) for the blend. After 24 hours the blend had not absorbed significantly more water at $0.167 \times 10^{-3}$ g/cm$^2$. Water absorption was determined by using the Cobb test (Tappi T441-69 and ASTM D2044-68; 4.0 cm ring with surface area of 12.56 cm$^2$).

Example 5

Figure 2:
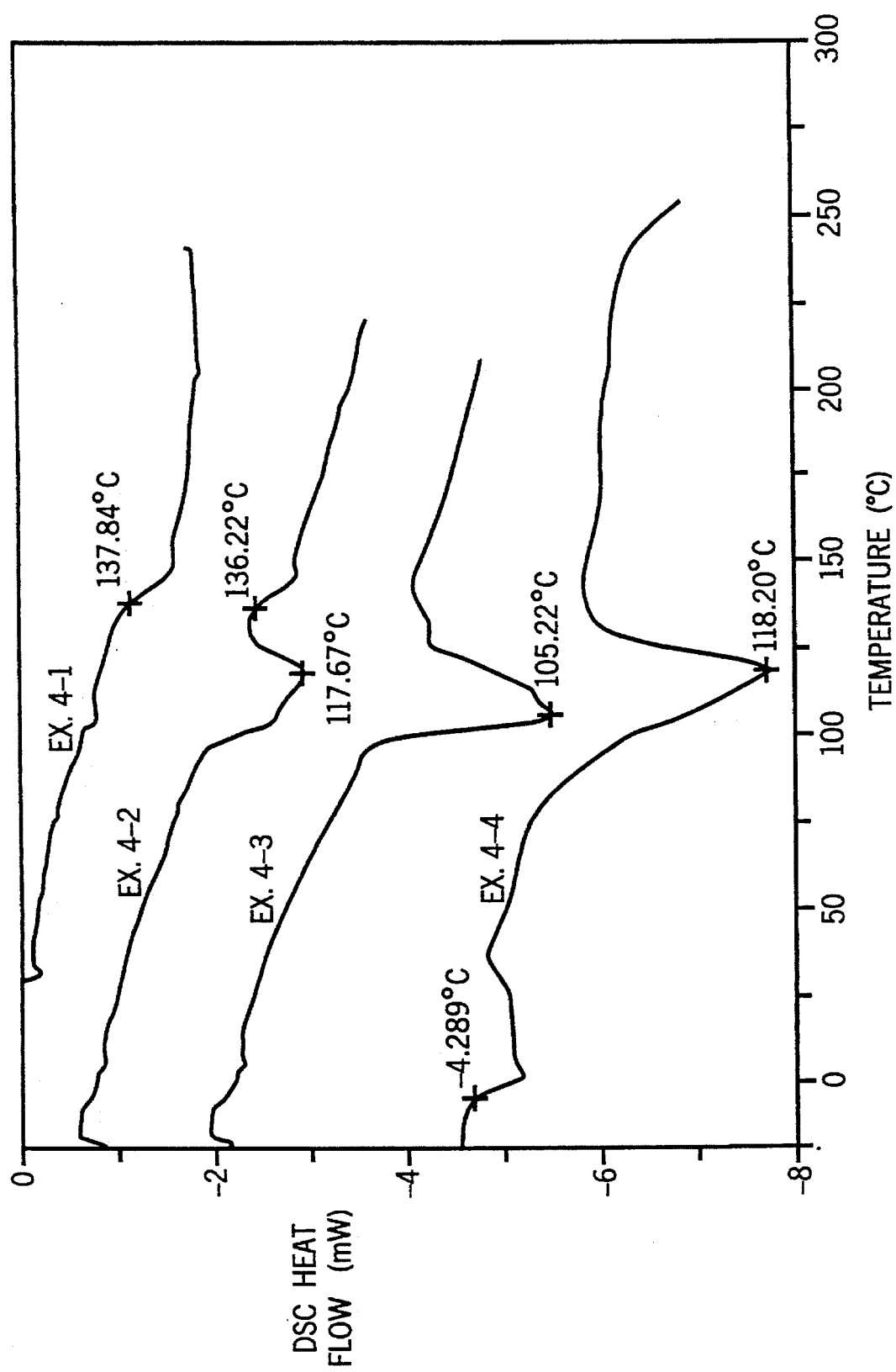
FIG. 2 is a graph of DSC of films prepared from blends of acetate/propionate-modified starch and poly(β-hydroxybutyrate-co-20%-βhydroxyvalerate: 100-0 from example 4-1, 80-20 from example 4-2, 50-50 from example 4-3 and 0-100 from example 4-4.

Comparison of DSC (Differential Scanning Calorimetry) scans, provided evidence for unusual compatibility between starch ester compositions and biodegradable polyesters or copolyesters. FIG. 2 shows the DSC scans for solution-cast films containing acetate/propionate-modified starch and PHB/V-20% HV, as prepared in Example 4. Their compositions are given in Table 1. FIG. 2 illustrates that the acetate/propionate-modified starch (see Ex. 4-1) is a predominantly amorphous polymer showing a clear glass transition around 138° C., with no observable melting endotherm, as described for the starch ester compositions in the co-pending patent application.[5] For the blend of Ex. 4-3 the original glass transition due to the starch component around 138° C. is absent (FIG. 2). The enthalpy of fusion, $\Delta H_m$, is about half the value of the pure PHB/V component (see Ex. 4-4 in Table 2), as expected for the 50/50 blend (19/0.5=38, compared with 43 J/g for PHB/V-20% HV). Without being restrictive, the absence of a glass transition at 138° C. is probably because it has shifted underneath the melting peak of the PHB/V component. This shift in Tg (observed also for several other blends of starch ester with PHB/V-12% V or with PCL, as described below) suggests that the amorphous component of the semi-crystalline PHB/V polyester is miscible with the amorphous starch ester polymer chain. These results also indicate that the starch ester is immiscible with the crystalline PHB/V component, and largely excluded from it. In spite of this incompatibility with the crystalline component, a compatibilized blend (polymer alloy) is obtained because of the miscibility of the amorphous PHB/V component with the starch ester phase. This compatibilization confers unique properties to these starch ester/polyester blends.

For an 80/20 blend of starch ester and PHB/V (see Ex. 4-2 in Table 2), $\Delta H_m$, was observed to be proportional to the weight fraction of the PHB/V component (8.8/0.2=44, compared with 43 J/g for PHB/V-20% HV), as also observed for the 50/50 blend. However, unlike the 50/50 blend, the original glass transition of the modified starch was observed in the DSC of the 80/20 blend (see Ex. 4-2 in FIG. 2). Since the starch ester is present in such large excess, only a fraction of the amorphous starch ester can be dissolved into the amorphous component of the PHB/V polymer. Therefore, the observed Tg is due to the starch ester phase which is not included in the amorphous component of the PHB/V polymer. This is further supported by the fact that the magnitude of the glass transition, $\Delta H_g$, was observed to be lower for the 80/20 blend than expected on the basis of the weight fraction of the starch ester component. It is to be noted that the amorphous PHB/V component is an integral part of the semicrystalline PHB/V polymer chains, and thus restricted in close proximity to the PHB/V crystalline domains. Table 2 summarizes the thermal transitions observed for these.

Table 3 shows similar results for extruded blend compositions containing a propionate-modified starch (prepared according to the method described in Example 1), poly(β-hydroxybutyrate-co-12%-β-hydroxyvalerate) and 10% and 20% triacetin plasticizer. These blends also contained 1% boron nitride nucleating agent, commonly used for effective crystallization of PHB/V.[54] As observed for the solution-cast blends discussed above, the glass transition temperature Tg shifts to lower temperatures, while the crystallinity of the PHB/V component is maintained. These results further illustrate that the melting temperature, and therefore the processing temperature, are reduced by blending the semi-crystalline polyester with starch ester and ester plasticizer. The miscibility of starch esters with ester plasticizers of the solvent type was described in the co-pending patent application.[5] Table 4 illustrates the miscibility of PHB/V with such solvent-type ester plasticizers. These results indicate that all three components, i.e. starch ester, polyester, and ester plasticizer, are mutually compatible.

Figure 3:
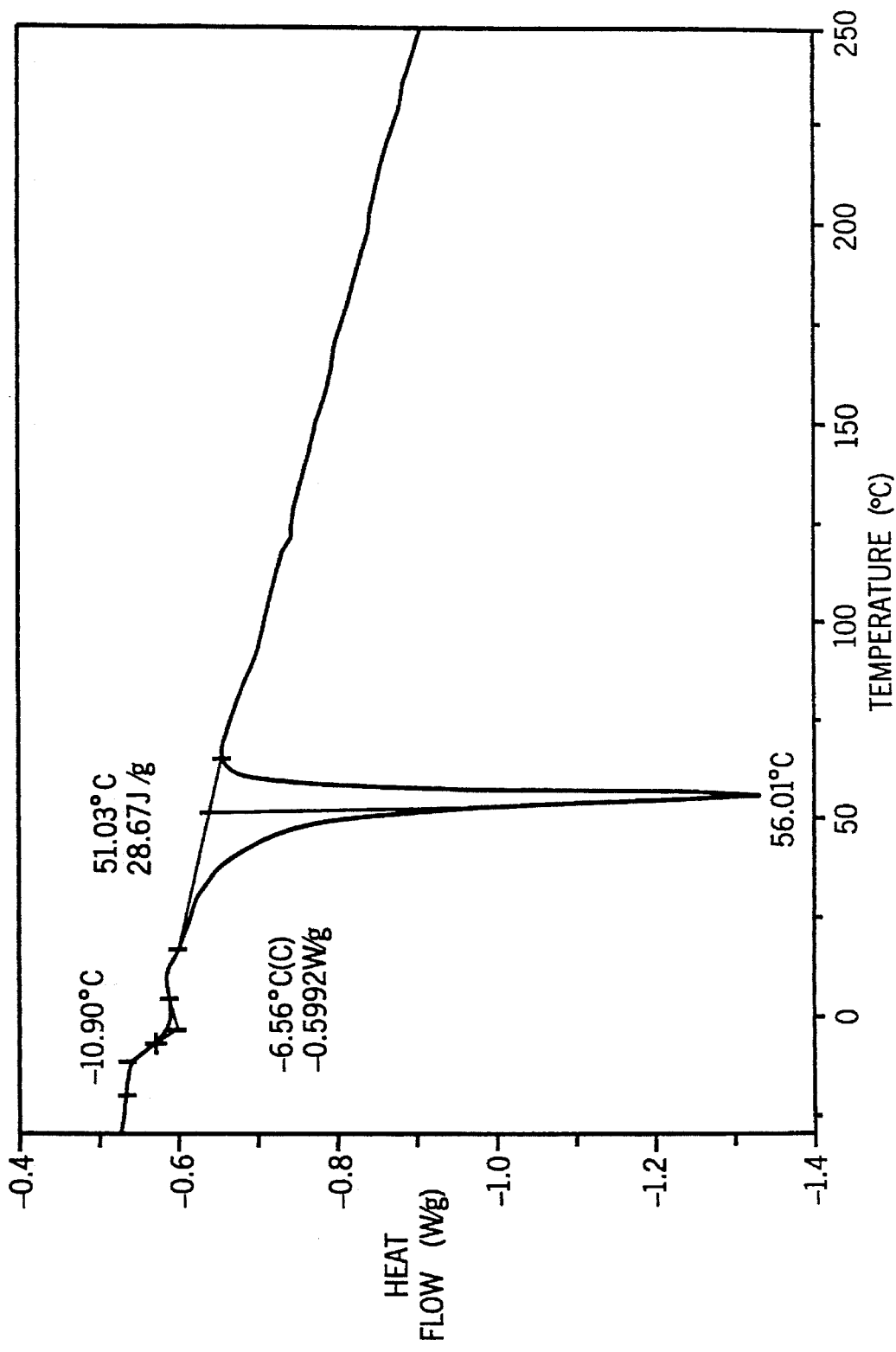
FIG. 3 is a graph showing DSC thermal analysis of an extruded blend of propionate-modified starch, poly(ε-caprolactone) and triacetin.

Another example of this starch ester-polyester compatibility (see FIG. 3 and Table 5) is illustrated by the blend of a propionate-modified starch (prepared according to the method described in Example 1) with poly(ε-caprolactone) (PCL). For the blend of Ex. 5-4 a sharp melting peak was observed due to the crystalline PCL component, in addition to a single Tg at an intermediate composition between the Tg's of the two polymers (FIG. 3/Table 5). This indicates a high degree of compatibility of the amorphous PCL component with the amorphous starch ester polymer, in a manner similar to the PHB/V blends.

These results serve to illustrate that new, mutually compatible, multi-component blend compositions with improved processability and properties have been realized.

Example 6

The starches esters used in this example were prepared by the procedure given in Examples 1 and 2, as also described in the co-pending patent application.[5]

To illustrate the thermoplastic behavior of the starch esters and starch ester blends prepared by this invention, 12 compositions are listed in Table 6 (master batch 1 to 12). Blends were prepared containing polycaprolactone (PCL) or 10 poly(β-hydroxybutyrate-co-β-hydroxyvalerate) (PHB/V) as examples of biodegradable polyesters. The sample of PCL was TONE polymer P-767 obtained from Union Carbide; PHB/V samples were technical-grade copolymer containing about 12 mole % β-hydroxyvalerate and were obtained from Imperial Chemical Industries (ICI) in the U.K. These master batches were processed in conventional plastics-type processing equipment which was used without any special modifications. To determine the mechanical properties, such as tensile strength, initial modulus and elongation to break, the master batches were extruded using twin-screw extrusion and injection molded into tensile test bars. The master batches given in Table 6 were prepared by using a Containerized Batch Mixer equipped with a tumbling 8 quart stainless steel mixing chamber, internal mixing agitators and liquid injection auxiliary for homogeneous dispersion of plasticizers. This solids mixer provided homogeneous mixtures of the modified starch ester powders with the polyesters, plasticizer and other additives such as fillers and nucleating agents (about 1% boron nitride was added for β-hydroxybutyrate/valerate copolymers[54]). A twin-screw extruder with 30 cm diameter screws (L/D=14) and dual orifice die, along with a pelletizer, was used to process the powders from master batches 1 to 12 at a temperature profile of 105° C. (zone 1: feed), 165° C. (zone 2), 165° C. (zone 3), and 155° C. (zone 4: Die), to give pelletized (or granulated) resins. Injection molded tensile test bars were prepared and tested according to ASTM standard procedure #D638-91 (using Type 1 tensile bar specimen). Three sets of about 10 tensile test bars were equilibrated for 48 hours at 10, 50 and 93±5% relative humidity conditions, and their mechanical properties are given in Table 7.

Table 7 gives the mechanical strength (Maximum Psi), stiffness (Young's Modulus) and elongation-at-break for test bar samples equilibrated at low, medium and high relative humidity (RH), and compares modified starch compositions with blends containing biodegradable polyesters. The mechanical properties that can be attained for the modified starch compositions, also described in the co-pending invention, are in the range of polystyrene (i.e. master batch 3 samples, for example). This exemplifies the feasibility of using these biodegradable bio-based plastics for various single-use applications such as polystyrene type disposable cutlery and various packaging materials. These starch ester compositions did not exhibit drastic changes in appearance with increasing relative humidity levels. Relatively minor changes were observed in mechanical properties (Table 7) with increasing relative humidity. Under the same conditions, an unmodified starch composition (co-pending patent, Table 2, master batch 1) became sticky, and exhibited severe swelling and cracking and surface deformations.

Table 7 and 8 further illustrate a significant enhancement in mechanical strength (Maximum Psi) and stiffness (Young's Modulus) achieved by the addition of a filler. Table 8 compares the mechanical properties at 50 % relative humidity. Starch ester compositions are compared with similar compositions of blends (i.e., with the same level of plasticizer and filler). By comparing the mechanical properties for samples prepared from master batch 6 vs. 7 and 11 vs. 12, it can be deduced that the addition of such polyesters virtually maintains the mechanical strength of the corresponding starch ester composition, while decreasing the modulus and increasing the elongation at break. Thus a tougher material results, having similar strength but higher flexibility. This is further confirmed by comparing 1 vs. 4 and 1 vs. 8.

Comparison of the mechanical properties for samples prepared from master batch 4 vs. 5 and 8 vs. 9 in Table 8 indicates that the modulus can be significantly enhanced by the addition of talc. These results further illustrate the increase in maximum tensile strength observed for these blends achieved by the addition of a filler. The increase in modulus resulting from the addition of a filler to a polymeric resin is well known to those skilled in the art. However, the corresponding increase in mechanical strength observed here for the blend compositions with addition of talc, or other fillers, is a unique embodiment of this invention. Without being restrictive, the observed increases in modulus and tensile strength are probably largely due to the modified starch component as a result of good wetting of the modified starch polymer with the filler surface, as described in the co-pending patent application.[5] This is supported by the higher tensile strength determined for talc-filled modified starch compositions compared with corresponding talc-filled blend compositions, such as 3 vs.5, 3 vs. 9 and 2 vs. 10 in Table 8.

Example 7

Figure 4A:
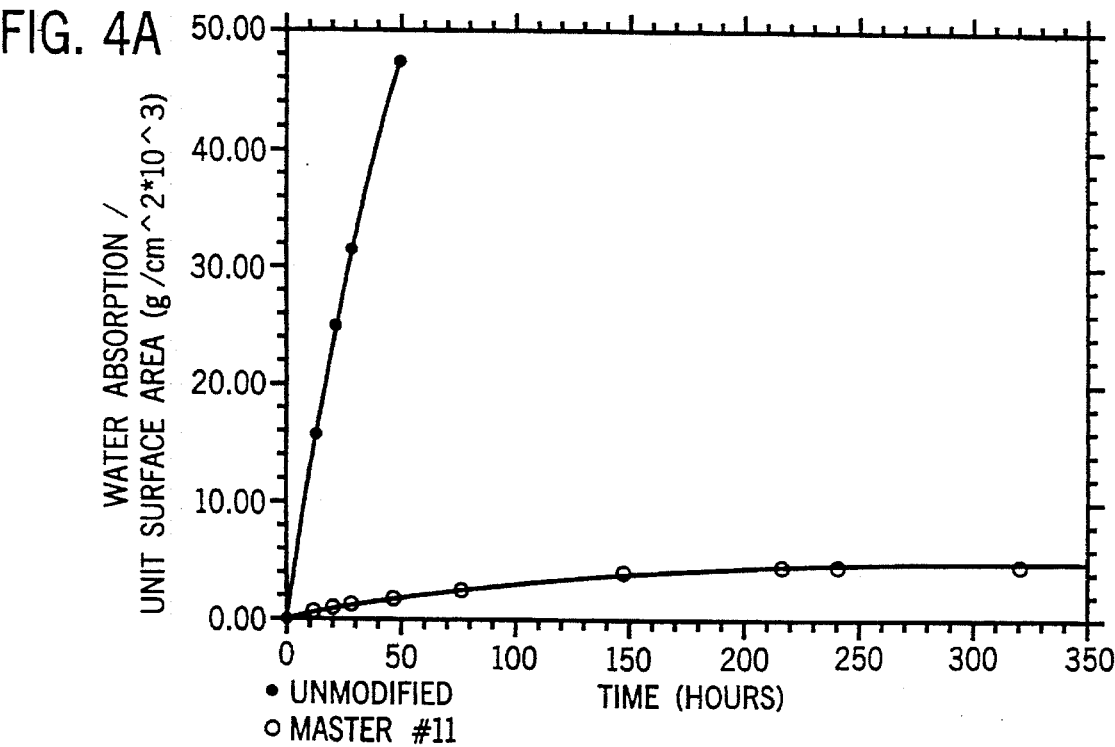
FIG. 4 is a graph showing the composition of relative water absorption of unmodified starch, starch ester, and starch ester blend compositions; tensile bar samples were elquilibrated at 50% RH for 5 days and stored at 93% RH, ●Master #11, ○Master #8, □Master #12, ×Master #7, +PHV/V -12%HV and ΔPCL.
Figure 4B:
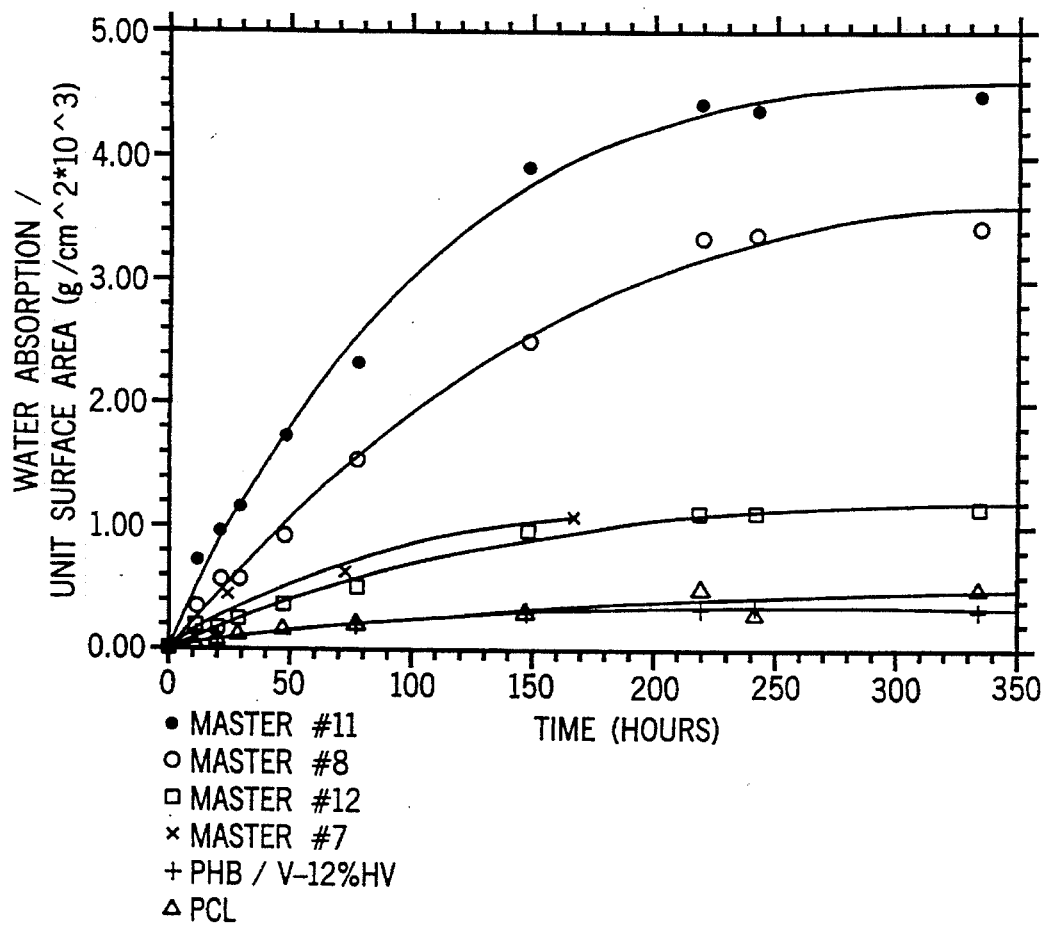

Whereas the experiment illustrated in FIG. 1 involved the direct contact of liquid water with a film, this example presents results of water vapor absorption at a constant and high relative humidity. Tensile bar samples were equilibrated at 50% RH for 5 days, and stored at 93% RH. The increase in water absorbed onto 3 tensile test bars was determined gravimetrically, and normalized to the surface area of the samples. The average values are reported in FIG. 4, which illustrates the improved moisture resistance of a starch ester composition as compared with an unmodified starch composition, as also described in the co-pending patent application.[5] FIG. 4 further illustrates that by blending with a biodegradable polyester significant additional improvements in moisture resistance can be attained.

Example 8

For the preparation of extruded film good mixing of modified starch with the biodegradable polyesters and plasticizer was found to be essential. Thus, 252.6 g of proportionated starch powder (prepared by the method in Example 1) was thoroughly mixed in a blender with 252.4 g PHB/ V-12% V, 126.9 g triacetin, and 6.3 g boron nitride (40/40/ 20/1). The mixture was extruded using a twin-screw extruder with 30 cm diameter screws (L/D=14) and dual orifice die. The powder was processed at a temperature profile of 50° C. (zone 1: feed), 157° C. (zone 2), 147° C. (zone 3), and 127° C. (zone 4: Die), and pelletized (or granulated) to give resin pellets reminiscent of conventional commercial plastic pellets. These pellets were subsequently extruded on a single-screw extruder with 1" diameter screw (L/D=24), equipped with an 8" film die and three-stack chill roller and film winder. The temperature profile was approximately 93° C. (zone 1: feed), 121° C. (zone 2), 121° C. (zone 3), and 121° C. (zone 4: Die); the chill rollers were maintained at about 40° C. The resulting film was translucent and flexible having a thickness of 1 to 10 mil depending on the chill roll speed. Water droplets placed on the thermoplastic film beaded up on the surface as a result of the moisture resistance of the starch ester/polyester blend described in the present invention. Similar observations of transparency, flexibility and moisture resistance were made for solution-cast films prepared in Example 4.

Example 9

The procedure in Example 8 was followed. Thus, propionated starch powder (prepared by the method in Example 1) was thoroughly mixed in a blender with PCL TONE Polymer P-767, and triacetin in a ratio of 38 to 53 to 9. The mixture was extruded with a twin-screw extruder at a temperature profile of 50° C. (zone 1: feed), 110° C. (zone 2), 110° C. (zone 3), and 105° C. (zone 4: Die), and pelletized (or granulated) to give resin pellets reminiscent of conventional commercial plastic pellets. These pellets were subsequently extruded on a single-screw extruder at a temperature profile of approximately 50° C. (zone 1: feed), 110° C. (zone 2), 110° C. (zone 3), and 110° C. (zone 4: Die); the chill rollers were maintained at about 18° C. The resulting film was translucent and flexible having a thickness of 1 to 10 mil depending on the chill roll speed. Water droplets placed on the thermoplastic film beaded up on the surface as a result of the moisture resistance of modified starch and the polyester blend described in the present invention. Similar observations of transparency, flexibility and moisture resistance were made for solution-cast films.

The above examples demonstrate that the present invention provides new starch-based materials which utilize agricultural resources that can be returned to nature in an environmentally sound manner. The polymeric materials made in accordance with the present invention are environmentally compatible, this being achieved by designing and engineering fully biodegradable materials that are thermoplastic, yet breakdown under appropriate environmental conditions in a manner similar to their organic (lignocellulosic) counterparts.

The invention has been described in an illustrative manner, and it is to be understood the terminology used is intended to be in the nature of description rather than of limitation.

Many modifications and variations of the present invention are possible in light of the above teachings. Therefore, it is to be understood that within the scope of the appended claims, the invention may be practiced otherwise than as specifically described.

REFERENCES CITED 1. a) "Degradable Materials: Perspectives, Issues and Opportunities", S. A. Barenberg, J. L. Brash, R. Narayan, A. E. Redpath, Eds., CRC Press, Boca Raton, (1990); b) "Biodegradable Polymers and Plastics", M. Vert, J. Feijen, A. Albertsson, G. Scott, E. Chiellini, Eds., The Royal Society of Chemistry, Cambridge, (1992).

2. D. F. Gilmore, S. Antoun, R. W. Lenz, S. Goodwin, R. Austin, R. C. Fuller, "The Fate of 'Biodegradable' Plastics in Municipal Leaf Compost", J. Industr. Microbiol., 10, 199–206, (1992).

3. a) P. Barak, Y. Coquet, T. R. Halbach, J. A. E. Molina, "Biodegradability of Polyhydroxybutyrate(co-hydroxyvalerate) and Starch-Incorporated Polyethylene Plastic Films in Soils", *J. Environ. Qual.*, 20, 173, (1991); b) L. R. Krupp, W. J Jewell, "Biodegradability of Modified Plastic Films in Controlled Biological Environments", *Environ. Sci. Technol.*, 26, 193, (1991).

4. C. L. Swanson, R. L. Shogren, G. F. Fanta, S. H. Imam, J. Environm. Polymer Degrad. 1 (2), 155–165, (1993).

5. U.S. patent application designated U.S. Ser. No. 08/097,550 at the offices of Reising, Ethington, Barnard, Perry & Milton of Troy, Mich., co-filed with the present application.

6. R. Narayan, "Biodegradation of Polymeric Materials (Anthropogenic Macromolecules) During Composting", Proceedings: International Composting Research Symposium, Columbus, Ohio, May 27–29, 1992.

7. R. M. Rowell, T. P. Schultz, R. Narayan, Eds., "Emerging Technologies for Materials and Chemicals from Biomass", 200th National Meeting of the American Chemical Society, Washington, D.C., Aug. 26–31, 1990, ACS Symposium Series 476, American Chemical Society, Washington, D.C., Chapter 5, pp. 57–75, (1992).

8. U.S. Pat. No. 4,891,404, R. Narayan, G. T. Tsao, C. J. Biermann, "Biodegradable Graft Copolymers", to Purdue Research Foundation, January 1990.

9. R. Narayan, "Preparation of Corn-Based Plastics for Materials Applications", First Annual Corn Utilization Conference, June 11–12, 209, (1987) .

10. N. Stacy, Z.-J. Lu, Z.-X. Chen, R. Narayan, "Biodegradable Natural-Synthetic Polymer Graft Copolymers, Antec, pp. 1362–1364, (1989).

11. R. Narayan, R. P. Neu, "Composite Systems of Lignocellulosics with Synthetic Polymers", *Mat. Res. Soc. Symp. Proc.* Vol. 197, pp. 55–66, (1990).

12. U.S. Pat. No. 5,095,054, G. Lay, J. Rehm, R. F. Septo, M. Thoma, J. P. Sachetto, D. J. Lentz, J. Silbiger, "Polymer compositions Containing Destructurized Starch", to Warner Lambert Co., Mar. 10, 1992.

13. PCT Int. Pat. Appl. WO 92/14782, C. Bastioli, V. Bellotti, A. Montino, "Biodegradable Compositions Based on Starch and Thermoplastic Polymers", Novamont S.P.A., 1992; PCT Int. Pat. Appl. WO 91/02025, C. Bastioli, V. Bellotti, G. Del Tredici, "A Polymer Composition including Destructured Starch and an Ethylene Copolymer", Novamont S.P.A., 1991; (See also WO 91/02023 and WO 91/02024).

14. U.S. Pat. No. 4,873,270, J. M. Aime, G. Mention, A. Thouzeau, "Polyurethane-Carbohydrate Based Substances which can be Calendered to Produce Biodegradable Materials", to Charbonnages De France, Oct. 10, 1989.

15. U.S. Pat. No. 3,850,862, R. A. Clendinning, J. E. Potts, W. D. Niegisch, "Blends of a Biodegradable Thermoplastic Dialkanoyl Polymer and a Naturally Occurring Biodegradable Product", to Union Carbide Corp., Nov. 26, 1974.

16. U.S. Pat. No. 3,850,863, R. A. Clendinning, J. E. Potts, W. D, Niegisch, "Blends of a Biodegradable Thermoplastic Oxyalkanoyl Polymer and a Naturally Occurring Biodegradable Product", to Union Carbide Corp., Nov. 26, 1974.

17. U.S. Pat. No. 4,863,655, N. L. Lacourse, P. A. Altieri, "Biodegradable Packaging Material and the Method of Preparation Thereof" to National Starch and Chemical Corporation, Sep. 5, 1989.

18. W. Jarowenko, "Acetylated Starch and Miscelaneous Organic Esters", Chapter 4 in "Modified Starches: Properties and Uses", O. B. Wurzburg, Ed., CRC Press, Boca Raton, Fla., (1986). (A review of the physical data and film properties for regular starch- and amylose esters with substitution levels approaching DS=3.0 is included in this reference).

19. Code of Federal Regulations, Title 21, Chapter 1, Part 172, Food Additives Permitted in Food for Human Consumption, Section 172,892, Food Starch-Modified, U.S. Government Printing Office, Washington, D.C., (1981).

20. J. W. Mullen and E. Pascu, "Possible Industrial Utilization of Starch Esters", *Ind Eng Chem.*, 35, (1943).

21. C. L. Swanson, R. L. Shogren, G. F. Fanta, S. H. Imam, *J. Environm. Polymer Degrad.* 1 (2), 155–165, (1993).

22. I. A. Wolff, D. W. Olds, G. E. Hilbert, "Triesters of Corn starch, Amylose, and Amylopectin", *Ind Eng Chem*, 43, 911, 1951.

23. C. J. Rivard, W. S. Adney, M. E. Himmel, D. J. Mitchell, T. B. Vinzant, K. Grohmann, L. Moens, H. Chum, "Effect of Natural Polymer Acetylation on the Anaerobic Bioconversion to Methane and Carbon Dioxide", National Renewable Energy Laboratory NREL, *Appl. Biochem. Biotechnol.* 34/35, 725–736, (1992).

24. A. Rudin, "The Elements of Polymer Science and Engineering", Academic Press, New York, Chapter 12, (1982).

25. a) U.S. Pat. No. 3,306,875, E. Cizek, "Forming Self-Condensation Condensation Products of Phenols Comprises Reacting Oxygen with Phenol where X ia a H, Cl, Br, or I; R is H, or a Monovalent Substituent", to General Electric Co., Feb. 28, 1967; b) J. Stoelting, F. E. Karasz, W. J. MacKnight, "Dynamic Mechanical Properties of Poly(2,6 -dimethyl-1,4-phenylene ether)-Polystyrene Blends", *Polym. Eng. Sci.*, 10 (3), 133, (1970).

26. S. Bloembergen, Ph.D. Thesis: "Characterization of Bacterial Poly(β-Hydroxybutyrate-co-β-Hydroxyvalerate) and Synthesis of Analogues via a Non-Biochemical Approach", Department of Chemistry, University of Waterloo, Waterloo, Ontario, Canada, 1987.

27. S. Bloembergen, D. A. Holden, T. L. Bluhm, G. K. Hamer, and R. H. Marchessault, "Synthesis of Crystalline β-Hydroxybutyrate/β-Hydroxyvalerate Copolyesters by Coordination Polymerization of β-Lactones", *Macromolecules*, 20, 3086, (1987).

28. R. H. Marchessault, T. L. Bluhm, Y. Deslandes, G. K. Hamer, W. J. Orts, P. R. Sundararajan, M. G. Taylor, S. Bloembergen and D. A. Holden, "Poly(β-Hydroxyalkanoates: Biorefinery Polymers in Search of Applications", IUPAC International Symposium on Polymers for Advanced Technologies—Polymers for Biosystems, Israel, Aug. 1987, *Makromol. Chem., Macromol. Symp.*, 19, 235, (1988).

29. S. Bloembergen, D. A. Holden, T. L. Bluhm, G. K. Hamer, and R. H. Marchessault, "Stereoregularity in Synthetic β-Hydroxybutyrate and β-Hydroxyvalerate Homopolyesters", *Macromolecules*, 22, 1656, (1989).

30. S. Bloembergen, D. A. Holden, T. L. Bluhm, G. K. Hamer, and R. H. Marchessault, "Isodimorphism in Synthetic Poly(β-Hydroxybutyrate-co-β-Hydroxyvalerate):

Stereoregular Copolyesters from Racemic β-Lactones", *Macromolecules*, 22, 1663, (1989).
31. R. Pearce, J. Jesudason, W. Orts, R. H. Marchessault, and S. Bloembergen, "Blends of Bacterial and Synthetic Poly(β-Hydroxybutyrate): Effect of Tacticity on Melting Behavior",*Polymer*, 33, 4647, (1992)
32. S. Bloembergen, D. A. Holden, G. K. Hamer, T. L. Bluhm, and R. H. Marchessault, "Studies of Composition and Crystallinity of Bacterial Poly(β-Hydroxybutyrate-co-β-Hydroxyvalerate)", *Macromolecules*, 19 (11), 2865, (1986).
33. T. L. Bluhm, G. K. Hamer, R. H. Marchessault, C. A. Fyfe, R. P. Veregin, "Isodimorphism in Bacterial Poly(β-Hydroxybutyrate-co-β-Hydroxyvalerate)", *Macromolecules*, 19 (11), 2871, (1986).
34. P. J. Barham, A. A. Keller, "The Relationship Between Microstructure and Mode of Fracture in Polyhydroxybutyrate", *J. Polym. Sci., Polym. Phys. Edn.*, 24, 69, (1986).
35. One approach to this problem has been the development of copolymers, poly(β -hydroxybutyrate-co-β-hydroxyvalerate) (PHB/V), marketed under the trade name BIOPOL by Imperial Chemical Industries (recently renamed Zeneca): Europ. Pat. Appl. 0,052,459, P. A. Holmes, L. F. Wright, S. H. Collins, "High Molecular Weight Co-Polyester(s) Prepared by Fermentation Contain Hydroxybutyric Acid Units and Units of Other Hydroxy Acids", to Imperial Chemical Industries PLC, May 26, 1982; Europ. Pat. Appl. 0,069,497, P. A. Holmes, L. F. Wright, S. H. Collins, "Co-Polyester Containing Mainly 3-Hydroxybutyrate Units Obtained by Culturing Polyester-Producing Microorganism, in Presence of Metabolisable Acid, During Polyester Accumulation Stage", to Imperial Chemical Industries PLC, Jan. 12, 1983.
36. M. Avella, E. Martuscelli, "Poly-D(−)-(3 -hydroxybutyrate)/Poly(ethylene oxide) Blends: Phase Diagram, Thermal and Crystallization Behavior", Polymer 29, 1731, (1988)
37. P. Greco, E. Martuscelli, "Crystallization and Thermal Behavior of Poly-D(−)-(3 -hydroxybutyrate)-Based Blends", Polymer, 30, 1475, (1989).
38. H. Marand, M. Collins, "Crystallization and Morphology of Poly(vinylidene Fluoride)/Poly(3 -Hydroxybutyrate) Blends", *Am. Chem. Soc., Div. Polym. Chem.*, Polymer Preprints 31, 552, (1990).
39. P. Dave, R. A. Gross, C. Brucato, S. Wong, S. P. McCarthy, "Biodegradation of Blends Containing Poly(3-hydroxybutyrate-covalerate)", *Biotechnol. Polym., Proc. Am. Chem. Soc. Symp. Polym. Biotechnol.*, C. G. Gebelein, Plenum, New York, (1991); P. Dave, M. Parikh, M. Reeve, R. A. Gross, S. P. McCarthy, "Morphological and Blend Miscibility Effects on the Biodegradability of Poly(3-hydroxybutyrate-co-3 -hydroxyvalerate) and Blends", *Polym. Mater. Sci. Eng.*, 63, 726, (1990); P. Dave, N. J. Ashar, R. A. Gross, S. P. McCarthy, "Survey of Polymer Blends Containing Poly(3 -hydroxybutyrate-co-16% hydroxyvalerate)", *Am. Chem. Soc., Div. Polym. Chem., Polymer Preprints* 31 (1), 442, 1990.
40. U.S. Pat. No. 4,393,167, P. A. Holmes, F. M. Willmouth, A. B. Newton, "Polymer Blends Containing Polymer of Poly(β-hydroxybutyrate) and Chlorine or Nitrile Containing Polymer", to Imperial Chemical Industries PLC, Dec. 7, 1983.
41. D. F. Gilmore, N. Lotti, R. W. Lenz, R. C. Fuller, M. Scandola, "Biodegradability of Poly(3-hydroxybutyrate-co-3-hydroxyvalerate) with Ester-substituted Celluloses", in "Biodegradable Polymers and Plastics", M. Vert J. Feijen, A. Albertsson, G. Scott, E. Chiellini, Eds., The Royal Society of Chemistry, Cambridge, pp. 251–254, (1992).
42. U.S. Pat. No. 3,734,979, J. V. Koleske, E. R. Walter, "Shaped and Molded Articles of Polymer Blends Comprising Polyolefins and Lactone Polymer", to Union Carbide Chemicals and Plastics Co., May 22, 1973.
43. U.S. Pat. No. 3,632,687, J. V. Koleske, E. R. Walter, "Crystalline Polymer Alloys Comprising a Polymer from Cyclic Ester and an Alkene Polymer", to Union Carbide Chemicals and Plastics Co., Jan. 4, 1972.
44. U.S. Pat. No. 3,867,324, R. A. Clendenning, J. E. Potts, and S. W. Cornell, "Environmentally Degradable-Biodegradable Blend of an Oxyalkanoyl Polymer and an Environmentally Degradable Ethylene Polymer", to Union Carbide Chemicals and Plastics Co., Feb. 19, 1975.
45. C. V. Benedict, W. J. Cook, P. Jarrett, J. A. Cameron, S. J. Huang, J. P. Bell, "Fungal Degradation of Polycaprolactones", *J. Appl. Polym. Sci.*, 28, 327, (1983).
46. C. V. Benedict, J. A. Cameron, S. J. Huang, J. P. Bell, "Polycaprolactone Degradation by Mixed and Pure Cultures of Bacteria and a Yeast", *J. Appl. Polym. Sci.*, 28, 335, (1983).
47. W. J. Cook, J. A. Cameron, J. P. Bell, S. J. Huang, "Scanning Electron Microscopy Visualization of Biodegradation of Polycaprolactone by Fungi", *J. Polym. Sci., Polym. Lett. Ed.*, 19, 159, (1981).
48. Y. Tokiwa, T. Ando, T. Suzuki, "Degradation of Polycaprolactone by a Fungus", J. Ferment. Technol., 54, 603, (1976).
49. R. D. Fields, F. Rodriguez, R. K. Finn, "Mechanical Degradation of Polyesters: Polycaprolactone Degraded by P. pullans", *J. Appl. Polym. Sci.*, 18, 3571, (1974).
50. R. H. Marchessault, C. Monasterios, J. Jesudason, B. Ramsey, I. Saracovan, J. Ramsey, T. Saito, *Polym. Degrad. Stabil.*, in press.
51. Y. Doi, N. Kumugai, N. Tanahshi, K. Mukai, "Structural Effects on Biodegradation of Microbial and Synthetic poly(hydroxyalkanoates)", in "Biodegradable Polymers and Plastics", M. Vert, J. Feijen, A. Albertsson, G. Scott, E. Chiellini, Eds., The Royal Society of Chemistry, Cambridge, pp. 139–148, (1992).
52. P. Dave, M. Parikh, M. Reeve, R. A. Gross, S. P. McCarthy, "Morphological and Blend Miscibility Effects on the Biodegradability of poly(3-hydroxybutyrate-co-3-hydroxyvalerate) and Blends", *Polym. Mater. Sci. Eng.*, 63, 726, (1990).
53. R. L. Whistler, Ed., "Methods in Carbohydrate Chemistry", Vol. III—Cellulose, Academic Press, Inc., New York, pp. 201–203, (1963); (See also ASTM Standard Method D 871-72 (Reapproved 1983)).
54. PCT Int. Pat. Appl. WO91/19759, S. J. Organ, P. J. Barham, A. Webb, "Nucleation Agent for Microbiologically Produced Hydroxyalkanoate Polymers, Compositions and Process Therewith", to Imperial Chemical Industries PLC, Dec. 26, 1991.

TABLE 1

Preparation of films from solution blends of modified starch and poly(β-hydroxybutyrate-co-20%-β-hydroxyvalerate) in 45/55 vol. % acetone/methylene chloride

| Sample No. | Blend Ratio Mod. Starch-PHB/V | Weight of Component Blend (g) | | Solvent Volume (mL) | |
|---|---|---|---|---|---|
| | | Modified Starch | PHB/V-20% V | Acetone | $CH_2Cl_2$ |
| Ex. 4-1 | 100–0 | 7.5 | 0 | 11 | 14 |
| Ex. 4-2 | 80–20 | 12.0 | 3.0 | 31.5 | 38.5 |
| Ex. 4-3 | 50–50 | 7.5 | 7.5 | 45 | 55 |
| Ex. 4-4 | 0–100 | 0 | 7.5 | 40 | 49 |

TABLE 2

DSC thermal analysis of films prepared from solution-cast blends of acetate/propionate-modified starch and poly(β-hydroxybutyrate-co-20%-β-hydroxyvalerate)

| Sample No. | Blend Ratio Mod. Starch-PHB/V | DSC Scan No. | Tg (°C.) | Tm (°C.) | $\Delta H_m$ (J/g) |
|---|---|---|---|---|---|
| Ex. 4-1 | 100–0 | 1[a] | 138 | ND[b] | ND[b] |
| | | 2 | 139 | ND[b] | ND[b] |
| Ex. 4-2 | 80–20 | 1[c] | 136 | 118 | 8.8 |
| | | 2 | 141 | 114 | 8.0 |
| Ex. 4-3 | 50–50 | 1[c] | ND[b] | 105 | 19 |
| | | 2 | ND[b] | 114 | 18 |
| Ex. 4-4 | 0–100 | 1 | ND[b] | 116 | 43 |
| | | 2 | –4 | 118 | 30 |

[a] Sample annealed at 145° C. for 20 min.
[b] ND = Not detected in the range of –40 to 250° C.
[c] Sample annealed at 90° C. for 20 min.

TABLE 3

DSC thermal analysis of extruded blends of propionate-modified starch, poly(β-hydroxybutyrate-co-12%-β-hydroxyvalerate) and triacetin[a]

| Sample No. | Blend Ratio Mod. Starch-PHB/V-Triacetin | DSC Scan No. | Tg (°C.) | Tm (°C.) | $\Delta H_m$ (J/g) |
|---|---|---|---|---|---|
| Ex. 5-1 | 100–0–0 | 1[b] | 130 | ND[c] | ND[c] |
| | | 2 | 128 | ND[c] | ND[c] |
| Ex. 5-2 | 45–45–10 | 1 | ND[c] | 143/156 | 29 |
| | | 2 | 84 | 154 | 26 |
| Ex. 5-3 | 40–40–20 | 1 | 26 | 155 | 30 |
| | | 2 | — | — | — |
| Ex. 5-4 | 0–0–100 | 1 | 2 | 161 | 57 |
| | | 2 | 6 | 155/164 | 57 |

TABLE 3-continued

DSC thermal analysis of extruded blends of propionate-modified starch, poly(β-hydroxybutyrate-co-12%-β-hydroxyvalerate) and triacetin[a]

| Sample No. | Blend Ratio Mod. Starch-PHB/V-Triacetin | DSC Scan No. | Tg (°C.) | Tm (°C.) | $\Delta H_m$ (J/g) |
|---|---|---|---|---|---|

[a] Blend compositions contain 1% boron nitride nucleating agent
[b] Sample annealed at 125° C.
[c] ND = Not detected in the range of 0 to 250° C.

TABLE 4

DSC and DMA thermal analysis of extruded blends of poly(β-hydroxybutyrate-co-10%-β-hydroxyvalerate) and triacetin[a]

| Sample No. | Blend Ratio PHB/V-triacetin | DSC Scan No. | Tg[b] (°C.) | Tm (°C.) | $\Delta H_m$ (J/g) |
|---|---|---|---|---|---|
| Ex. 5-6 | 100–0 | 1 | 0.6/14/20 | 167 | 61 |
| | | 2 | — | 150/166 | 72 |
| Ex. 5-7 | 90–10 | 1 | –30/–7/11 | 160 | 46 |
| | | 2 | — | 144/161 | 51 |
| Ex. 5-8 | 80–20 | 1 | –49/–22/6 | 155 | 44 |
| | | 2 | — | 135/152 | 48 |

[a] All samples contain 1% boron nitride nucleating agent
[b] Values listed are the storage modulus, E', loss modulus, E", and tan δ, respectively, as determined by Differential Mechanical Analysis (DMA); under the same conditions, E' and E" for polystyrene were determined to be 106 and 117° C.

TABLE 5

DSC thermal analysis of an extruded blend of propionate-modified starch, poly(ε-caprolactone) and triacetin[a]

| Sample No. | Blend Ratio Mod. Starch-PCL-Triacetin | DSC Scan No. | Tg (°C.) | Tm (°C.) | $\Delta H_m$ (J/g) |
|---|---|---|---|---|---|
| Ex. 5-1 | 100–0–0 | 1[b] | 130 | ND[c] | ND[c] |
| | | 2 | 128 | ND[c] | ND[c] |
| Ex. 5-4 | 38–53–9 | 1 | –9 | 55 | 31 |
| | | 2 | –11 | 56 | 29 |
| Ex. 5-5 | 0–0–100 | 1 | –60 | 62 | 45 |
| | | 2 | –60 | 59 | 23 |

[a] Blend composition of 39 wt % propionate-modified starch, 53% poly(ε-caprolactone) and 8% triacetin
[b] Sample annealed at 135° C.
[c] ND = Not detected in the range of 0 to 250° C.

TABLE 6

Compositions of Master Batches used for Twin-Screw Extrusion, Injection Molding and Tensile Testing

| Components (in PPH) | Master Batch No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Modified HVII Starch (Example 1) | 0 | 0 | 0 | 0 | 0 | 90 | 45 | 0 | 0 | 0 | 0 | 0 |
| Modified HVII Starch (Example 2) | 90 | 81 | 63 | 67.5 | 47.2 | 0 | 0 | 67.5 | 47.2 | 40.5 | 85 | 42.5 |
| PCL[a] | 0 | 0 | 0 | 22.5 (25%) | 15.8 (25%) | 0 | 45 (50%) | 0 | 0 | 0 | 0 | 0 |
| PHB/V-12% V[a] | 0 | 0 | 0 | 0 | 0 | 0 | 0 | 22.5 (25%) | 15.8 (25%) | 40.5 (50%) | 0 | 42.5 (50%) |

TABLE 6-continued

Compositions of Master Batches used for Twin-Screw Extrusion, Injection Molding and Tensile Testing

| Components | Master Batch No. | | | | | | | | | | | |
|---|---|---|---|---|---|---|---|---|---|---|---|---|
| (in PPH) | 1 | 2 | 3 | 4 | 5 | 6 | 7 | 8 | 9 | 10 | 11 | 12 |
| Triacetin[a] | 10 | 9 | 7 | 10 | 7 | 10 | 10 | 10 | 7 | 9 | 15 | 15 |
| (Glycerol Triacetate) | (10%) | (10%) | (10%) | (10%) | (10%) | (10%) | (10%) | (10%) | (10%) | (10%) | (15%) | (15%) |
| Talc | 0 | 10 | 30 | 0 | 30 | 0 | 0 | 0 | 30 | 10 | 0 | 0 |
| Boron Nitride | 0 | 0 | 0 | 0 | 0 | 0 | 0 | 1 | 1 | 1 | 0 | 1 |
| Total Rel. Wt. (g) | 100 | 100 | 100 | 100 | 100 | 100 | 100 | 101 | 101 | 101 | 100 | 101 |

[a] Number in parentheses is weight % based on polymer in the master batch

TABLE 7

Tensile Properties of Injection Molded Test Bars Prepared with Biodegradable Starch Ester Compositions and Blends with Biodegradable Polyesters

| Master Batch No. | Maximum Tensile Strength (Psi) | | | Young's Modulus (MPsi) | | |
|---|---|---|---|---|---|---|
| | 10% RH | 50% RH | 93% RH | 10% RH | 50% RH | 93% RH |
| 1 | 1700 ± 178[a] (3)[b] | 2455 ± 161[a] (3)[b] | 1715 ± 224[a] (6)[b] | 0.235 ± 0.013[a] (3)[b] | 0.262 ± 0.011[a] (3)[b] | 0.164 ± 0.017[a] (6)[b] |
| 2 | 3232 ± 343[a] (8)[b] | 3019 ± 281[a] (10)[b] | 2388 ± 191[a] (7)[b] | 0.376 ± 0.021[a] (8)[b] | 0.376 ± 0.054[a] (10)[b] | 0.396 ± 0.050[a] (7)[b] |
| 3 | 5141 ± 327[a] (9)[b] | 4524 ± 71[a] (8)[b] | 4001 ± 380[a] (9)[b] | 0.763 ± 0.037[a] (9)[b] | 0.662 ± 0.028[a] (8)[b] | 0.624 ± 0.019[a] (9)[b] |
| 4 | 2485 ± 81[a] (7)[b] | 2296 ± 121[a] (6)[b] | 1864 ± 69[a] (7)[b] | 0.190 ± 0.014[a] (7)[b] | 0.156 ± 0.007[a] (6)[b] | 0.126 ± 0.013[a] (7)[b] |
| 5 | 3765 ± 131[a] (8)[b] | 2823 ± 88[a] (7)[b] | 2272 ± 59[a] (9)[b] | 0.496 ± 0.036[a] (8)[b] | 0.390 ± 0.055[a] (7)[b] | 0.372 ± 0.020[a] (9)[b] |
| 6 | 2292 ± 158[a] (6)[b] | 2466 ± 206[a] (7)[b] | 2040 ± 355[a] (7)[b] | 0.214 ± 0.024[a] (6)[b] | 0.175 ± 0.009[a] (7)[b] | 0.122 ± 0.021[a] (7)[b] |
| 7 | — | 2156 ± 20[a] (11)[b] | — | — | 0.100 ± 0.003[a] (11)[b] | — |
| 8 | 2441 ± 183[a] (5)[b] | 2342 ± 243[a] (5)[b] | 2007 ± 107[a] (6)[b] | 0.223 ± 0.018[a] (5)[b] | 0.195 ± 0.013[a] (5)[b] | 0.174 ± 0.011[a] (6)[b] |
| 9 | 3326 ± 77[a] (7)[b] | 2852 ± 85[a] (7)[b] | 2491 ± 103[a] (8)[b] | 0.606 ± 0.054[a] (7)[b] | 0.490 ± 0.024[a] (7)[b] | 0.498 ± 0.043[a] (8)[b] |
| 10 | 1888 ± 62[a] (8)[b] | 1841 ± 36[a] (8)[b] | 1479 ± 59[a] (8)[b] | 0.214 ± 0.010[a] (8)[b] | 0.219 ± 0.014[a] (8)[b] | 0.179 ± 0.015[a] (8)[b] |
| 11 | 2896 ± 322[a] (5)[b] | 2172 ± 445[a] (6)[b] | 1710 ± 119[a] (5)[b] | 0.160 ± 0.008[a] (5)[b] | 0.198 ± 0.007[a] (6)[b] | 0.100 ± 0.011[a] (5)[b] |
| 12 | — | 2041 ± 67[a] (9)[b] | — | — | 0.149 ± 0.008[a] (9)[b] | — |

| Master Batch No. | % Elongation At Break | | |
|---|---|---|---|
| | 10% RH | 50% RH | 93% RH |
| 1 | 0.67 ± 0.06[a] (3)[b] | 1.14 ± 0.12[a] (3)[b] | 1.13 ± 0.24[a] (6)[b] |
| 2 | 0.92 ± 0.16[a] (8)[b] | 1.03 ± 0.20[a] (10)[b] | 1.14 ± 0.14[a] (7)[b] |
| 3 | 1.28 ± 0.29[a] (9)[b] | 1.95 ± 0.39[a] (8)[b] | 1.57 ± 0.21[a] (9)[b] |
| 4 | 1.71 ± 0.12[a] (7)[b] | 2.02 ± 0.35[a] (6)[b] | 2.48 ± 0.15[a] (7)[b] |
| 5 | 1.28 ± 0.09[a] (8)[b] | 1.45 ± 0.16[a] (7)[b] | 1.65 ± 0.24[a] (9)[b] |
| 6 | 1.20 ± 0.04[a] (6)[b] | 1.89 ± 0.51[a] (7)[b] | 3.01[d] ± 0.11[a] (7)[b] |
| 7 | — | 19.9 ± 3.3[a] (11)[b] | — |
| 8 | 1.31 ± 0.14[a] (5)[b] | 1.63 ± 0.18[a] (5)[b] | 1.72 ± 0.13[a] (6)[b] |
| 9 | 0.78 ± 0.05[a] (7)[b] | 0.90 ± 0.09[a] (7)[b] | 0.76 ± 0.08[a] (8)[b] |
| 10 | 1.17 ± 0.07[a] (8)[b] | 1.16 ± 0.06[a] (8)[b] | 1.15 ± 0.08[a] (8([b] |
| 11 | 2.27 ± 0.64[a] (5)[b] | 1.78 ± 0.59[a] (6)[b] | 3.07[d] ± 0.11[a] (5)[b] |
| 12 | — | 6.91 ± 0.56[a] (9)[b] | — |

TABLE 7-continued

Tensile Properties of Injection Molded Test Bars Prepared with Biodegradable
Starch Ester Compositions and Blends with Biodegradable Polyesters

[a] Standard deviation (1 × s)
[b] Values in parenthesis indicate the # of tensile test bars (no jaw breaks) used to calculate the average and standard deviation

TABLE 8

Trends in Tensile Properties of Injection Molded Test Bars Prepared with Biodegradable
Starch Ester Compositions and Blends with Biodegradable Polyesters

| Master Batch No. | PCL (Wt. %)[a] | PHB/V-12% V (Wt. %)[a] | Talc (PPH) | Triacetin (Wt. %)[a] | Maximum Tensile Strength (Psi)[b] | Young's Modulus (MPsi)[b] | % Elongation at Break[b] |
|---|---|---|---|---|---|---|---|
| 1[c]  | 0  | 0  | 0  | 10 | 2455 | 0.262 | 1.14 |
| 4[c]  | 25 | 0  | 0  | 10 | 2296 | 0.156 | 2.02 |
| 3[c]  | 0  | 0  | 30 | 10 | 4524 | 0.662 | 1.95 |
| 5[c]  | 25 | 0  | 30 | 10 | 2823 | 0.390 | 1.45 |
| 6[d]  | 0  | 0  | 0  | 10 | 2466 | 0.175 | 1.89 |
| 7[d]  | 50 | 0  | 0  | 10 | 2156 | 0.100 | 19.9 |
| 1[c]  | 0  | 0  | 0  | 10 | 2455 | 0.262 | 1.14 |
| 8[c]  | 0  | 25 | 0  | 10 | 2342 | 0.195 | 1.63 |
| 3[c]  | 0  | 0  | 30 | 10 | 4524 | 0.662 | 1.95 |
| 9[c]  | 0  | 25 | 30 | 10 | 2852 | 0.490 | 0.90 |
| 2[d]  | 0  | 0  | 10 | 10 | 3019 | 0.376 | 1.03 |
| 10[d] | 0  | 50 | 10 | 10 | 1841 | 0.219 | 1.16 |
| 11[c] | 0  | 0  | 0  | 15 | 2172 | 0.198 | 1.78 |
| 12[c] | 0  | 50 | 0  | 15 | 2041 | 0.149 | 6.91 |

[a] Number in parentheses is weight % based on polymer in the master batch
[b] Values for samples equilibrated for 48 hours at 50% relative humidity (see Table 3 for standard deviations, number of test bar samples used, etc.)
[c] Modified starch prepared by the method in Example 2
[d] Modified starch prepared by the method in Example 1

What is claimed is:

1. A biodegradable moldable product or film product prepared from a compatible blend comprising a biodegradable, hydrophobic, water repellant, amorphous, starch ester having a degree of substitution of about 1.0 to about 2.5 DS and a biodegradable polyester selected from the class consisting of poly (ε-caprolactone) (PCL), poly(lactic acid) or polylactide (PLA), poly(glycolic acid) or polyglycolide (PGA), bacterial and synthetic poly(β -hydroxybutyrate-co-β-hydroxyvalerate) (PHB/V) and poly(β-hydroxyalkanoates) (PHA).

2. A product as set forth in claim 1 wherein said starch ester has an amylose content of equal to or greater than 50%.

3. A product as set forth in claim 2 wherein said starch ester has an amylose content of equal or greater than 70%.

4. A product as set forth in claim 1 wherein said starch ester has a degree of substitution of 1.2 to 1.7 DS.

5. A product as set forth in claim 1 wherein said starch ester an ester of starch wherein said starch is selected from the group consisting of cornstarch, potato starch, tapioca starch, rice starch, wheat starch, and cassava starch.

6. A product as set forth in claim 1 further including a solvent-type low molecular weight plasticizer.

7. A product as set forth in claim 6 wherein the plasticizer is selected from the group consisting of dipropyl-, dibutyl-, dihexyl-, diheptyl-, dioctyl-, dimethyl- and diethylsuccinate and related esters, glycerol triacetate glycerol mono- and diacetate, glycerol mono-, di and tripropionate, glycerol tributanoate glycerol mono- and dibutaoate, glycerol mono-; di- and tristearate, glycerol esters, lactic acid esters, citric acid esters, adipic acid esters, stearic acid esters, oleic acid esters, ricinoleic acid esters, fatty acid esters, erucic acid esters, soybean oil, and caster oil.

8. A moldable composition comprising a compatible thermoplastic blend of a biodegradable, predominantly amorphous, hydrophobic, water repellant, starch ester having a degree of substitution (DS) of about 1.0 to about 2.5 DS and a biodegradable polyester is selected from the group consisting of poly(ε-caprolactone) (PCL), poly(lactic acid) or polylactide (PLA), poly(glycolic acid) or polyglycolide (PGA), bacterial and synthetic poly(β-hydroxybutyrate-co-β-hydroxyvalerate) (PHB/V), poly(β-hydroxyalkanoates) (PHA), and aliphatic biodegradable polyesters.

9. A composition of claim 8 in which the starch ester has an amylose content greater than 50% by weight.

10. A composition of claim 8 which contains a filler.

11. A molded product formed by heating a composition of claim 8 so that it is thermoplastic and then shaping it into a product.

12. A method of forming a film which comprises dissolving a composition of claim 8 in a solvent and casting the solution on a solid substrate, removing the solvent, and then removing the film which remains from the solid substrate.

13. A method of forming a product which comprises heating a composition of claim 8 until it is thermoplastic and shaping it into a product.

* * * * *